United States Patent
Shimizu et al.

(10) Patent No.: US 8,038,797 B2
(45) Date of Patent: Oct. 18, 2011

(54) APPARATUS AND METHOD FOR MANUFACTURING MAGNETIC RECORDING MEDIUM

(75) Inventors: Takahiro Shimizu, Matsumoto (JP); Akihide Hara, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 1292 days.

(21) Appl. No.: 11/619,309

(22) Filed: Jan. 3, 2007

(65) Prior Publication Data

US 2007/0160749 A1 Jul. 12, 2007

(30) Foreign Application Priority Data

Jan. 6, 2006 (JP) ................................. 2006-001535

(51) Int. Cl.
- C23C 16/00 (2006.01)
- C23C 14/00 (2006.01)
- B23H 7/26 (2006.01)
- B05D 5/12 (2006.01)

(52) U.S. Cl. ................. 118/729; 118/719; 204/297.06; 204/298.15; 414/941; 427/131

(58) Field of Classification Search ............. 156/345.32; 204/297.06–297.1, 297.06, 298.01, 298.15; 118/500, 728; 414/941

See application file for complete search history.

(56) References Cited

U.S. PATENT DOCUMENTS 5,795,448 A * 8/1998 Hurwitt et al. ............. 204/192.1
6,660,089 B2 * 12/2003 Nozawa et al. ............... 118/500

FOREIGN PATENT DOCUMENTS

| JP | 07-243037 A | 9/1995 |
|---|---|---|
| JP | 2001-216689 | 8/2001 |
| JP | 2001-216689 A | 8/2001 |
| JP | 2007-026516 | 2/2007 |

OTHER PUBLICATIONS

Substantive Examination issued in corresponding Malaysian application No. PI 20064787, dated Oct. 19, 2009.

Certificate of Grant issued in corresponding Singapore application No. SG 134223 which is cited in Substantive Examination issued in corresponding Malaysian application No. PI 20064787.

Notification of Reasons for Refusal issued in corresponding Japanese Patent Application No. 2006-001535 dated Feb. 12, 2010. Partial English translation provided.

Singapore Search and Examination Report (Australia) dated Mar. 4, 2008 of Corresponding Application No. 200609009-6.

* cited by examiner

*Primary Examiner* — Karla Moore
*Assistant Examiner* — Nathan K Ford
(74) *Attorney, Agent, or Firm* — Rossi, Kimms & McDowell LLP

(57) ABSTRACT

A method and apparatus for manufacturing a magnetic recording medium uses a small-diameter insulating substrate. The apparatus includes a carrier for a special size of 3.5 inches for receiving a plurality of small-diameter insulating substrates. Seed layers are deposited on the substrates, then each substrate is rotated to shift the position of the substrate so that the movable claw contacts the deposited seed layer. A bias voltage is applied via the movable claw for subsequent deposition layers.

7 Claims, 9 Drawing Sheets

FIG. 9

| PHASE | 1 (13) | 3 | 5 | 7 | 9 | 11 | 12 |
|---|---|---|---|---|---|---|---|
| SPRING MEMBER | CLOSE (SUPPORT) | ↑ | OPEN (RELEASE) | ↑ | CLOSE (SUPPORT) | ↑ | ↑ |
| CHUCK | CLOSE (RELEASE) | OPEN (HOLDING) | ↑ | ↑ | ↑ | CLOSE (RELEASE) | ↑ |
| ROTATION | INITIAL POSITION | ↑ | ↑ | ROTATED BY PREDETERMINED ANGLE | ↑ | ↑ | INITIAL POSITION |

APPARATUS AND METHOD FOR MANUFACTURING MAGNETIC RECORDING MEDIUM

BACKGROUND

An external recording device for a computer mostly uses a magnetic disk as a recording medium. A standard magnetic disk has an outer diameter of 2.5 to 3.5 inches. A deposition process on a standard insulating substrate 2.5 to 3.5 inches in diameter for a magnetic disk is typically performed by a single-substrate-processing. The following two methods, for example, are used to apply a bias voltage on the insulating substrate during deposition. In one method, a conductive film (typically a base film) is deposited on the insulating substrate while being supported by a support tool at a particular position. Then, the portion supporting the insulating substrate is shifted to a different position and then a bias voltage is applied on the insulating substrate via the support tool and the conductive film while the supporting tool supports the portion on which the conductive film was deposited. In another method, a bias terminal is made to contact an end face of the insulating substrate after depositing the conductive film, and then the bias voltage is directly applied on the insulating substrate.

While the demand for a magnetic disk having a small diameter of 1.25 inches or less has gradually increased in recent years, the magnetic disk manufacturing apparatus has not changed. Although the same deposition device for the standard substrate 3.5 inches in diameter can be used to deposit layers on a small-diameter insulating substrate, the efficiency of a target to a product suffers, resulting in reduction in productivity.

When multiple-substrate-processing (for example, four-substrate-processing) small-diameter substrates to improve productivity, since the size of an objective product is smaller, the technique for shifting an insulating substrate proposed for example in JP-A-2001-216689 or counterpart U.S. Pat. No. 6,660,089 cannot be carried out. Thus, when multiple-substrate-processing is carried out, deposition is performed on an insulating substrate without applying a bias voltage on the substrate, or a base layer is first deposited, then a product is removed from a vacuum apparatus to shift and support the insulating substrate, and then deposition is performed again with the bias voltage applied in the vacuum apparatus.

In the former technique where no bias voltage is applied, an electromagnetic conversion property as a major property of a product is reduced. On the other hand, in the latter method, the insulating substrate needs to be temporarily removed from the vacuum apparatus and shifted to a different position. Consequently, quality of the product can be deteriorated by particles induced when the substrate is placed into or taken out from the vacuum apparatus.

Accordingly, there remains a need for a more efficient multiple-substrate-processing for small-diameter substrates without deteriorating the quality. The present invention addresses this need.

SUMMARY OF THE INVENTION

The present invention relates to a method and apparatus for manufacturing a magnetic recording medium.

One aspect of the present invention is an apparatus for simultaneously manufacturing a plurality of magnetic recording media. The apparatus includes a deposition device that forms a plurality of layers, including a magnetic layer, on each of a plurality of insulating substrates. The apparatus also includes a carrier that holds the plurality of insulating substrates. The carrier has a plurality of support members each for supporting one of the plurality of insulating substrates at a predetermined position. The apparatus also includes a shift mechanism that collectively changes the position of each of the plurality of insulating substrates supported by the respective support member to a different position by rotating the respective insulating substrate held by the carrier by a predetermined rotation angle. The support members are electrically conductive, and electrically connectable to a bias unit for applying a bias voltage on the insulating substrates.

Each of the insulating substrates is disk shaped, with a center hole. The support members each have a deformation portion that is elastically deformable and a contact portion at one end of the deformation portion for contacting an outer periphery or end face of one of the insulating substrates. The shift mechanism includes a plurality of first members each for holding and releasing one of the insulating substrates from a side of the respective center hole thereof, and for rotating the one substrate. The number of the first members corresponds to the number of the insulating substrates. The shift mechanism also includes a plurality of second members each for supporting one of the insulating substrates by controlling the respective contacting portion to contact the respective outer periphery of the one insulating substrate to thereby transmit elastic force of the deformation portion to the one insulating substrate and to release the respective contact portion from the respective outer periphery of the one insulating substrate. The number of the second members corresponds to the number of the insulating substrates. The shift mechanism further includes a rotational shaft, a plurality of cams provided on the rotational shaft, and a transmission mechanism that transmits rotation of the cams to move both the first and second members. The cams and the transmission mechanism allow the first members to hold and release the substrates and rotate the substrate by the predetermined rotation angle, and allow the second members to support the substrates, successively as the rotational shaft is rotated.

Each of the plurality of first members has a first pivoting member pivotable about a predetermined pivoting center while being reciprocally biased at one end by the transmission mechanism, and a second pivoting member having one end disposed facing a middle portion of the first pivoting member between an end opposite the one end of the first pivoting member and the pivoting center, and an opposite the one end thereof facing the opposite end of the first pivoting member. The one end of the second member is connected to the middle portion by a tension spring, and both the opposite ends are insertable into the center hole of the respective insulating substrate.

The second pivoting member pivots via the tension spring in accordance with pivoting of the first pivoting member, both the opposite ends approach each other to release the respective substrate, and both the opposite ends move away from each other to hold the respective substrate. During an interval between holding and releasing the respective substrate, a central position of opposite ends of the first and second pivoting members becomes offset to displace the respective substrate from the carrier while the first member holds the respective substrates.

The apparatus further includes a mechanism that attaches or removes the carrier to allow a different carrier for holding differently sized insulating substrates to be attached.

Another aspect of the present invention is a method of manufacturing a magnetic recording medium. The method includes supporting a plurality of insulating substrates with a plurality of conductive support members to hold each of the insulating substrates at a respective predetermined position, depositing conductive layers on the insulating substrates held by the support members, rotating the insulating substrates to collectively change the positions of the insulating substrates supported by the support members from the predetermined positions to different positions so that the support members contact the conductive layers formed on the insulating substrates, and forming a plurality of layers, including a magnetic layer, on the conductive layer on each of the insulating substrates while applying a bias voltage on the insulating substrate through the support members and the conductive layers.

BRIEF DESCRIPTION OF THE DRAWINGS

FIG. 9 illustrates an operation state diagram in the substrate shift operation by the small-diameter substrate shift mechanism.

DETAILED DESCRIPTION

Figure 1:
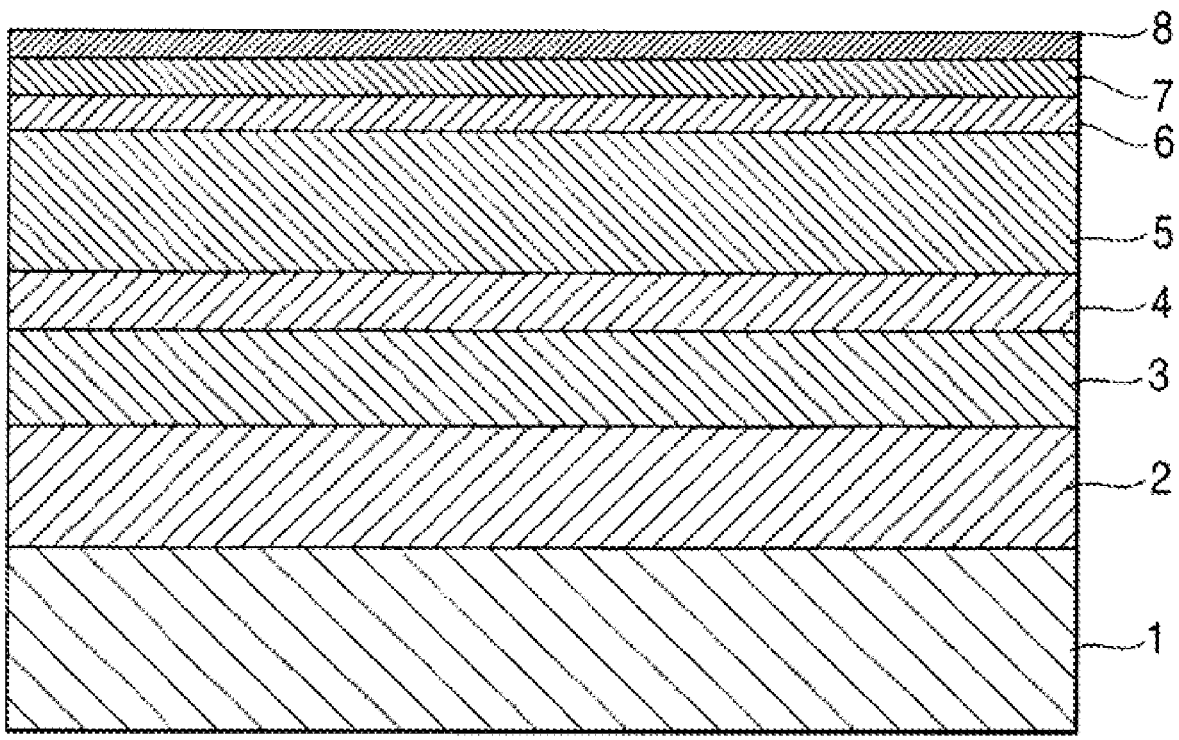
FIG. 1 illustrates a cross section of a magnetic recording medium manufacturable by apparatus and a method according to the present invention.

Referring to FIG. 1a nonmagnetic insulating substrate 1 (9) of tempered glass, glass ceramics, or Si has a disk shape having a hole in the center. A seed layer (base layer) 2, a nonmagnetic orientation control layer 3, a nonmagnetic base layer 4, a nonmagnetic intermediate layer 5, a magnetic layer 6, a passivation film 7, and a liquid lubricant layer 8 are stacked on the nonmagnetic insulating substrate 1. The seed layer 2 is a conductive material. The nonmagnetic orientation control layer 3, the nonmagnetic base layer 4, or the nonmagnetic intermediate layer 5 is sometimes changed in composition or the number of layers for orientation control of the magnetic layer. For example, the passivation film 7 can be a thin film mainly containing carbon. For example, the liquid lubricant layer 8 can be a perfluoropolyether series lubricant.

The present apparatus can simultaneously process multiple substrates (multiple-substrate-processing), for example, 4 small-diameter substrates, to deposit the respective layers 2 to 8 on each substrate. This is performed by depositing the seed layer (base layer) 2 on each nonmagnetic insulating substrate 1 in vacuum apparatus, then shifting each substrate using a substrate shift device, and then depositing the respective layers 2 to 8 with a bias voltage applied without taking in or taking out each substrate from the vacuum apparatus. The substrate shift device shifts each substrate to change the holding position on the upper part of the substrate after depositing the seed layer. A holding or support member holds the deposited conductive portion on the upper portion of each substrate. Consequently, a bias voltage can be applied from a bias circuit to the seed layer 2 and each insulating substrate 1 via the respective holding member.

Figure 2:
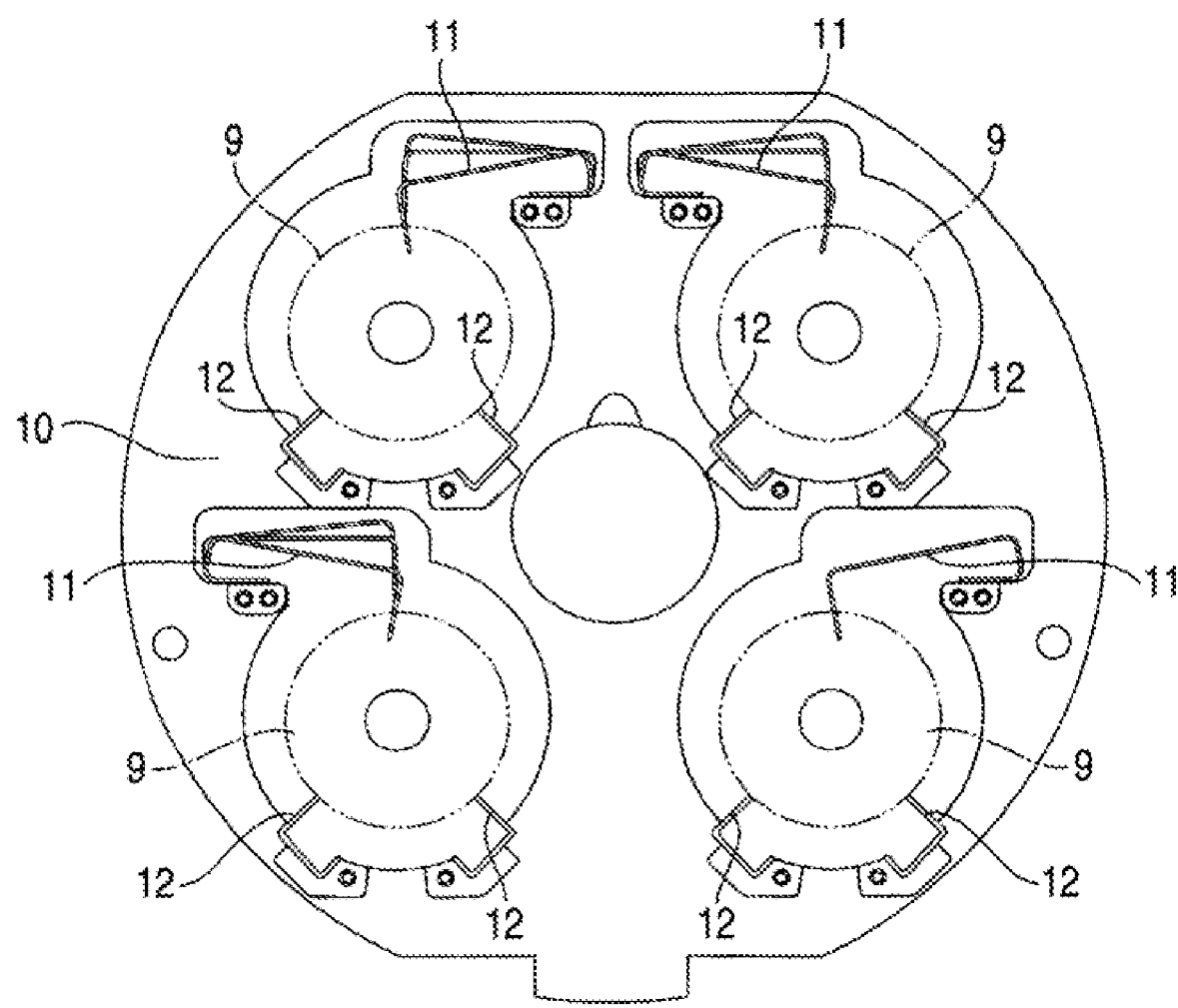
FIG. 2 illustrates a single small-diameter sputter carrier for a special size of 3.5 inches for mounting four substrates.
Figure 4:
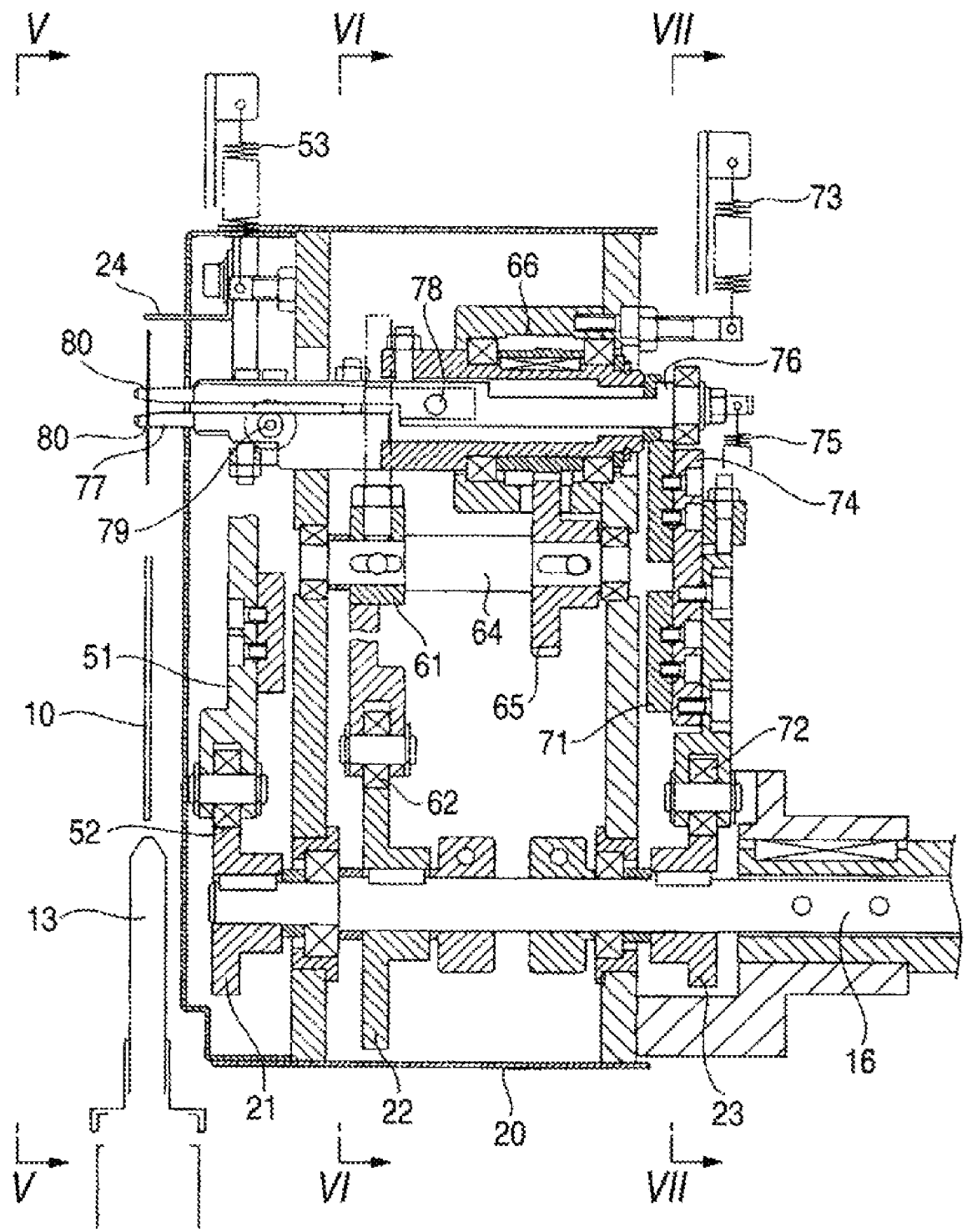
FIG. 4 illustrates a side view of a small-diameter substrate shift mechanism.

An example of four-substrate-processing in detail follows. While the example processes four substrates, the present invention is not limited thereto as any number of substrates can be processed simultaneously in an allowable range of a sputter cathode. Referring to FIG. 4, a small-diameter chemical-tempered glass substrate 9 having a smooth surface is used as a nonmagnetic insulating substrate. The substrate is textured and then washed. As shown in FIG. 2, the washed four small-diameter chemical-tempered glass substrates 9 are mounted on a single small-diameter sputter carrier 10 for special size of 3.5 inches. The small-diameter sputter carrier 10 has four holes or recesses each associated with a support member, namely one movable claw 11 and two stationary claws 12 for holding or supporting the substrate. The movable claw 11 comprises an L-shaped spring member and an arch-shaped contact portion at a tip portion of the L-shaped spring member. The arch of the contact portion is perpendicular to a longitudinal direction of the spring member and perpendicular to an edge or outer periphery of the glass substrate 9. Each of the stationary claws 12 also has an arch-shaped contact portion at its tip portion. The contact portions of the stationary claws 12 support the lower portion(s) of the substrate 9, and the contact portion of the movable claw 11 presses the upper portion of the substrate 9 by elastic or spring force of the spring member of the movable claw 11 to thereby support the substrate 9.

Figure 3:
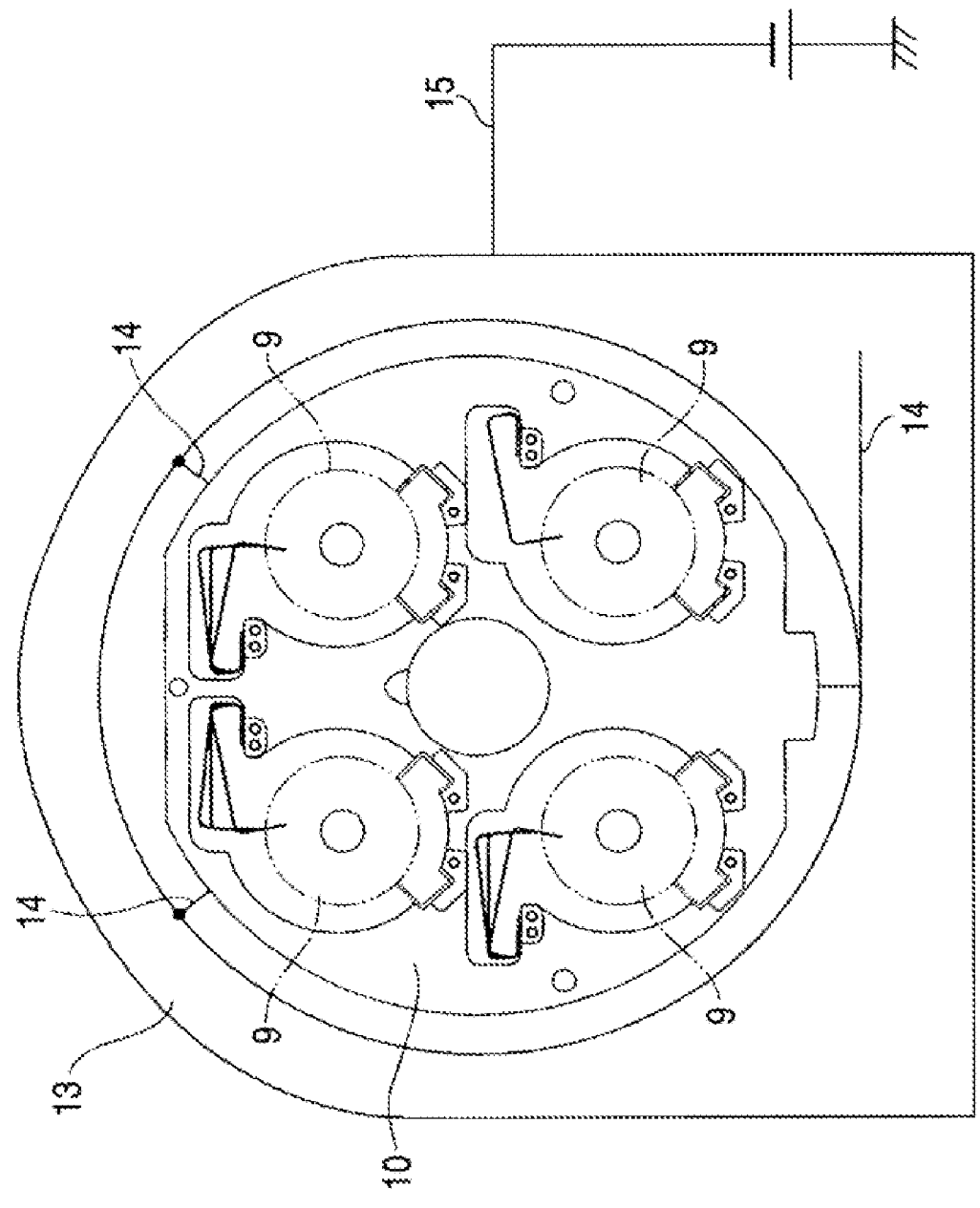
FIG. 3 illustrates a 3.5 inch sputter holder mounted on the small-diameter sputter carrier.

Next, the four substrates 9 are placed into a sputter apparatus (not shown) in a supported condition illustrated in FIG. 2 for simultaneous deposition of layers on the four substrates. In the sputter apparatus, as shown in FIG. 3, a 3.5 inch sputter holder 13 is provided, and a 3.5 inch substrate holding claw 14 holds the carrier 10, which is removably mounted. Accordingly, it can be replaced with a different carrier. When the sputter holder 13 is attached with the carrier 10, the movable claws 11 for holding the substrates are electrically connected to a bias circuit 15.

In the sputter apparatus, the seed layer 2 is deposited in the presence of Ar gas at pressure of 5 mTorr to 30 mTorr, then a shift mechanism (described later) simultaneous shifts the four substrates 9. As a result, the movable claw 11, which previously held an insulating portion not subjected to deposition, now holds the seed layer 2 at a location where the conductive layer has been deposited. Accordingly, in subsequent processes, a bias voltage can be applied from the bias circuit 15 to the seed layer 2 formed on the substrate 9 via the movable claw 11 holding the substrate to enable bias sputtering.

Figure 5:
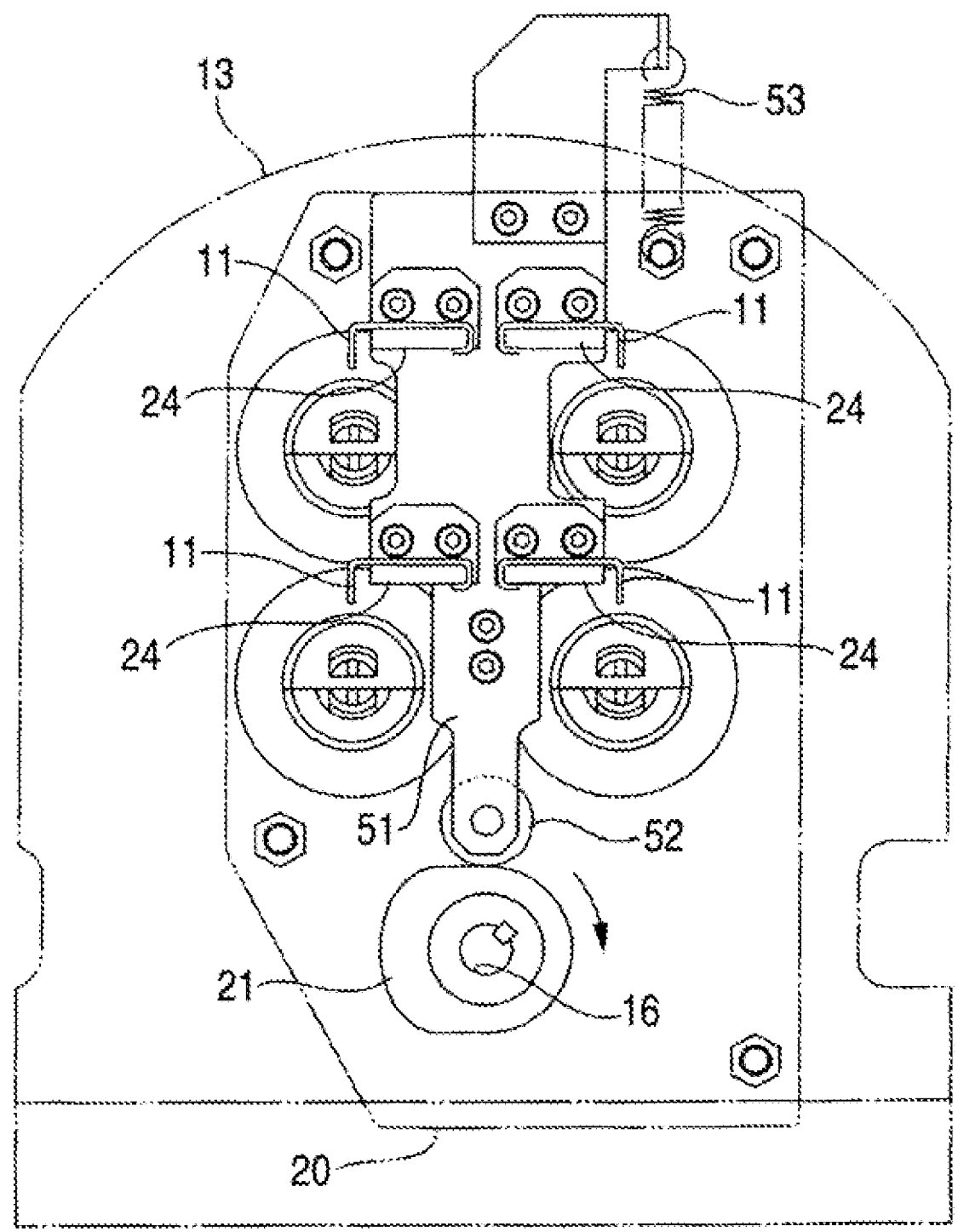
FIG. 5 illustrates a cross-sectional view taken along line V-V of FIG. 4.

Referring to FIGS. 4-7, description of the small-diameter substrate shift mechanism follows. Referring to FIG. 4, reference 16 denotes a drive shaft of a motor. Cams 21, 22 and 23, which are fixed to the drive shaft 16, are provided in the head portion 20. Referring to FIG. 5, a roller 52 is provided in a lower portion of a cam follower 51, and a spring 53 is provided in an upper portion thereof. The spring 53 biases the cam follower 51 to a lower side in the figure, i.e., pushes the cam follower. When the cam 21 makes one revolution clockwise, the cam follower 51 vertically reciprocates (up/down) once. The cam follower 51 has four lift members 24 each situated below one of the movable claws 11 with the shift mechanism opposing the sputter holder 13. Therefore, the lift members 24 can vertically move the movable claws 11 as the cam makes one revolution.

Figure 6:
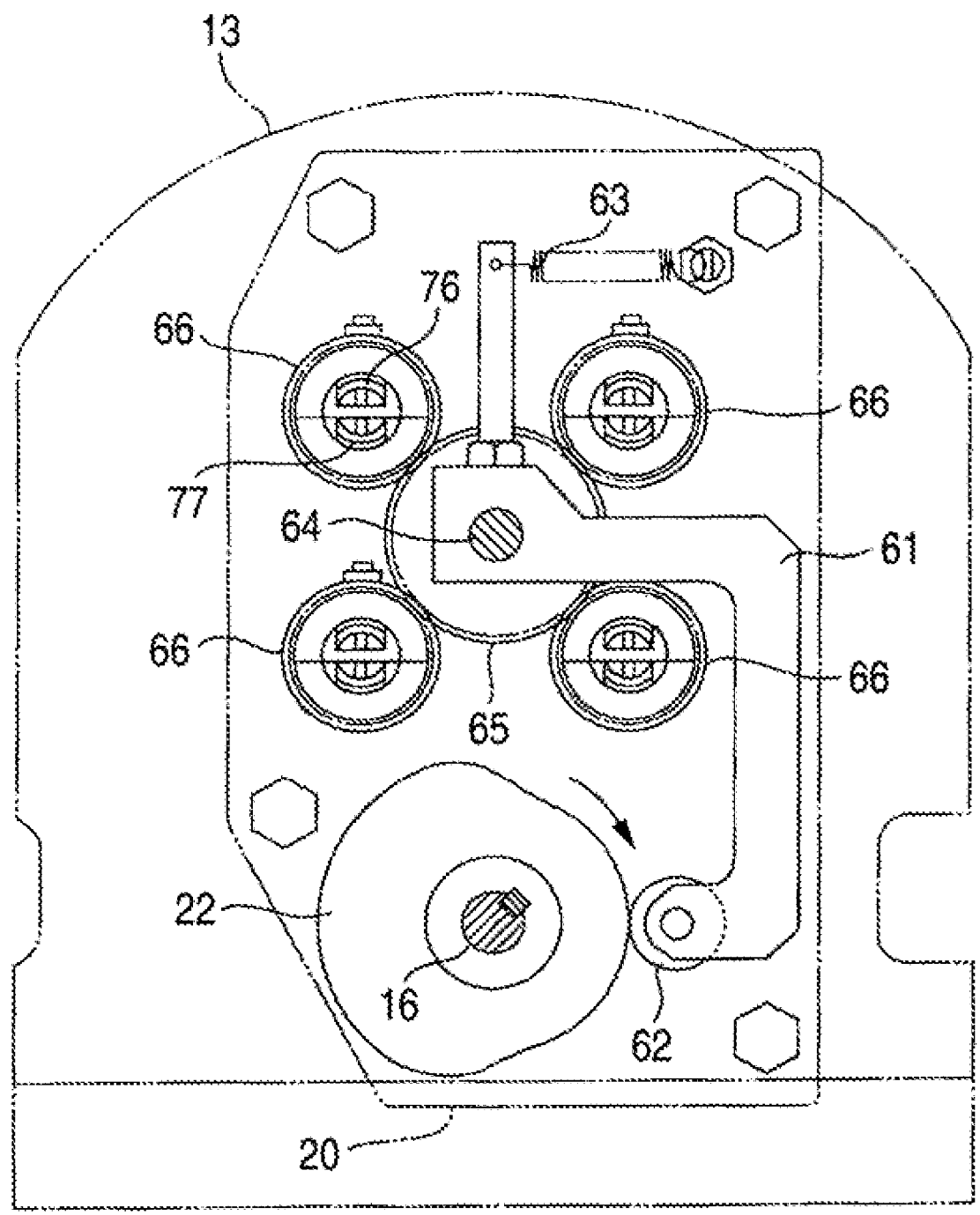
FIG. 6 illustrates a cross-sectional view taken along line VI-VI of FIG. 4.

Referring to FIG. 6, a roller 62 is provided in a lower portion of a cam follower 61, and a spring 63 is provided in an upper portion thereof. The spring 63 biases the roller 62 to the left (toward the cam) in the figure. A disk 65 is connected to the cam follower 61 via a shaft 64. Four cylindrical members 66 are engaged with the disk 65 by gears. A pair of pivoting members (described later in detail) are provided within each of the cylindrical members 66. When the cam 22 makes one revolution clockwise, the cam follower 61 pivotingly reciprocates once so that a lower portion where the roller 62 is attached to the cam follower 61 reciprocates left and right to rotate the shaft 64 counterclockwise and then clockwise. Therefore, the disk 65 rotates the four cylindrical members 66 clockwise by a predetermined angle, then disk 65 reversely rotates to return to its initial position.

Figure 7:
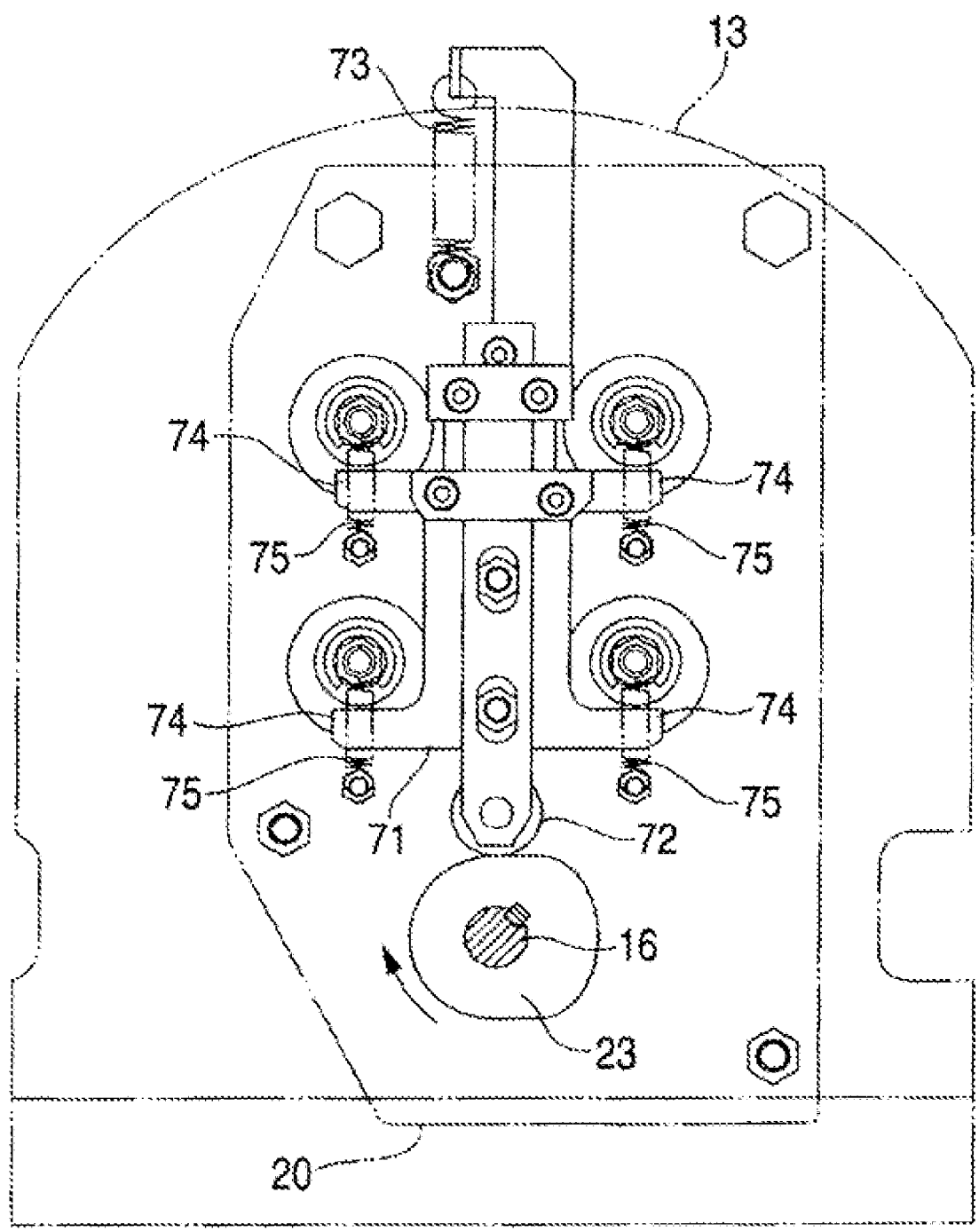
FIG. 7 illustrates a cross-sectional view taken along line VII-VII of FIG. 4.

Referring to FIGS. 4 and 7, a roller 72 is provided in a lower portion of a cam follower 71, and a spring 73 is provided in an upper portion thereof. The spring 73 biases the cam follower 71 to a lower side (i.e., toward the cam 23) in the figure. When the cam 23 makes one revolution clockwise, the cam follower 71 reciprocates vertically (up/down) once. The cam follower 71 has convex portions 74 at four 4 locations correspondingly to the substrates. A right end of a pivoting member 76 is situated on an upper part of each of the convex portions 74. The pivoting member 76 is pivotable about a shaft 78, and biased to a lower side (i.e., toward the convex portion) by a spring 75 at a right end. Another pivoting member 77, which is pivotable about a shaft 79, is provided facing or opposing the pivoting member 76 in a middle portion, namely between the shaft 78 and a left end of the pivoting member 76. A right end of the pivoting member 77 is connected to the middle portion by a tension spring (not shown).

As the convex portions 74 pivot the pivoting members 76 with a vertical movement of the cam follower 71, and the pivoting members 77 are also pivoted about the shaft 79. The pivoting directions of the pivoting members 76 and 77 are configured to be opposite to each other. Accordingly, both left ends of the pivoting members 76 and 77, which are opposing each other, approach each other and move away from each other with the rotation of the cam 23, while the central positions of the left ends of the pivoting member 76, 77 are vertically moved. The central positions are offset toward the upper side when the pivoting members 76 and 77 move away from each other as compared with the case where the pivoting members 76 and 77 approach each other. The pivoting members 76 and 77 are disposed such that their left ends are inserted into central holes of the substrates, and grooves 80 formed therein support internal edges of the substrates. Furthermore, the pivoting members 76 and 77 are configured to integrally rotate with rotation of the cylindrical members 66 in accordance with the rotation of the cam 22.

Next, the substrate shifting operation with the shift mechanism having the above configuration is described with reference to a cam chart of FIG. 8 and an operation state diagram of FIG. 9. FIGS. 5-7 show the positions of the cams at a rotation phase of 45° in FIG. 8. Hereinafter, "chuck" means an opening/closing holding mechanism for the substrates, including a pair of pivoting members 76, 77.

Figure 8:
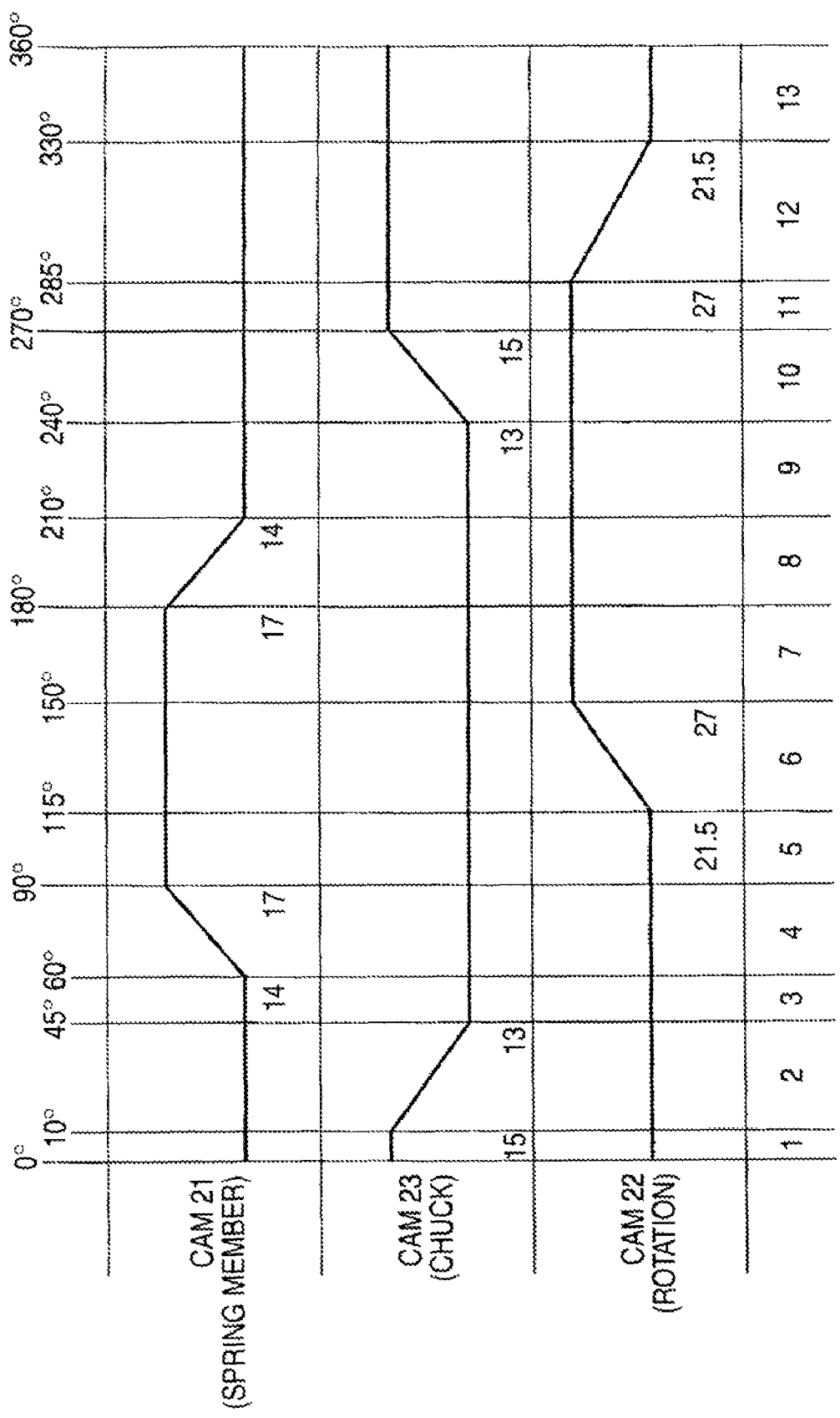
FIG. 8 illustrates a cam chart showing the substrate shift operation by the small-diameter substrate shift mechanism.

When the cam 21 makes one revolution in FIG. 8, the spring member of each of the movable claws 11 is moved up and opened, from the position of supporting an upper end of the substrate 9 in a closed condition, by displacement of the cam in phase 4, thereby releasing the spring member pressing force to the substrate 9. Displacement of the cam 21 in phase 8 is in the opposite direction to that of phase 4, by which the spring member is moved down, and returned to the position of supporting the upper end of the substrate 9 to the position prior to phase 4.

When the cam 23 makes one revolution, each chuck, including the pivoting members 76 and 77, is opened, from a condition of releasing the substrate 9 from its center hole, to a closed condition by displacement of the cam in phase 2, so that the substrate 9 is held. Displacement of the cam in phase 10 is in the opposite direction to that of phase 2, by which the chuck is closed so that the substrate 9 is released.

When the cam 22 makes one revolution, the rotational position of each cylindrical member 66 in phase 6 is rotated by a predetermined angle from an initial position to a rotated position. The chuck is also rotated by a predetermined angle. Displacement of the cam in phase 12 is in the opposite direction to that of phase 6, by which the cylindrical member is returned to the initial position. The chuck is also returned to its original rotation position.

FIG. 9 shows the operation conditions of the spring member, chuck, and cylindrical members 66 during one revolution of the three cams. Each substrate 9, which is supported at the upper end (spring member) in the initial position and released at a center hole side (chuck), is first fixed at the center hole side (chuck), then freely released at the upper end (spring member), and then rotated at the predetermined angle (rotation), and then supported at the upper end (spring member), and then released at the center hole side (chuck). Since the chuck is offset to the upper side when the substrate 9 is fixed at the center hole side, the substrate is raised such that the lower end of the substrate 9 is separated from the stationary claws 12. Thus, each substrate 9 is shifted and supported such that the movable claw 11, which previously held the portion of the substrate not subjected to deposition, now holds the portion of the substrate deposited with the seed layer 2 (conductive layer). Then, the rotation position of the chuck (cylindrical member 66) is returned to the initial position.

Once the substrate 9 is shifted to achieve electrical conduction after depositing the seed layer as described above, the nonmagnetic orientation control layer 3, nonmagnetic base layer 4, nonmagnetic intermediate layer 5, magnetic layer 6, passivation film 7, and liquid lubricant layer 8 are successively deposited with the bias voltage applied in the sputter apparatus.

The present apparatus can perform multiple-substrate-processing to improve productivity. Moreover, since upper layers with respect to the seed layer can be deposited while the bias voltage is applied, a magnetic recording medium without inducing reduction in magnetic property or deterioration in quality can be manufactured, thereby improving productivity while maintaining high quality. Moreover, since the small-diameter sputter carrier can be easily replaced with a conventional size, a conventional sized substrate can also be manufactured.

While the present invention has been particularly shown and described with reference to preferred embodiment thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

This application is based on, and claims priority to, JP PA 2006-001535 filed on 06 Jan. 2006. The disclosure of the priority application, in its entirety, including the drawings, claims, and the specification thereof, is incorporated herein by reference.

What is claimed is:

1. An apparatus for manufacturing a plurality of magnetic recording media comprising:
 a deposition device that forms a plurality of layers, including a magnetic layer, on each of a plurality of insulating substrates, each of which has a center hole;

a carrier that holds the plurality of insulating substrates, the carrier having a plurality of supports each for supporting one of the plurality of insulating substrates at a predetermined position, wherein each of the plurality of supports includes a movable member that is contactable with the outer periphery of one of the insulating substrates; and a shift mechanism including:
a plurality of first members each comprising first and second pivoting members insertable into the center hole of one of the insulating substrates for holding and releasing the one insulating substrate from inside the respective center hole, and for rotating the one insulating substrate;
a plurality of second members each for engaging one of the movable members and releasing the movable member from contact with the respective outer periphery of the one insulating substrate;
a rotational shaft;
a plurality of cams provided on the rotational shaft; and
a transmission mechanism that transmits rotation of the cams to move both the first and second members,
wherein the cams and the transmission mechanism allow the second members to release the movable members from contact with the insulating substrates and allow the first members to hold and rotate the insulating substrates successively as the rotational shaft is rotated so that each of the movable members contacts a first portion of one of the insulating substrate while each of the insulating substrates is in the predetermined position and contacts a second portion different from the first portion following the rotation of the substrates to a different position, to enable each of the movable members to contact part of the respective substrate having been deposited with a previously formed layer.

2. The apparatus according to claim 1, wherein:
each of the plurality of insulating substrates is disk shaped, and
each of the movable members is electrically conductive and has a deformation portion that is elastically deformable and a contact portion at one end of the deformation portion for contacting one of the insulating substrates.

3. The apparatus according to claim 2, wherein:
each of the first pivoting members is pivotable about a predetermined pivoting center while being reciprocally biased at one end by the transmission mechanism,
each of the second pivoting members has one end disposed facing a middle portion of the respective first pivoting member between an end opposite the one end of the respective first pivoting member and the pivoting center, and an opposite the one end thereof facing the opposite end of the respective first pivoting member, the one end of the second pivoting member being connected to the middle portion by a tension spring, and both the opposite ends being insertable into the center hole of the respective insulating substrate, and
the second pivoting member pivots via the tension spring in accordance with pivoting of the respective first pivoting member, both the opposite ends approaching each other to release the respective substrate, and both the opposite ends moving away from each other to hold the respective insulating substrate, and during an interval between holding and releasing the respective insulating substrate, a central position of opposite ends of the first and second pivoting members becomes offset to displace the respective insulating substrate from the carrier while the first member holds the respective insulating substrate.

4. The apparatus according to claim 3, further comprising:
a mechanism that attaches or removes the carrier to allow a different carrier for holding differently sized insulating substrates to be attached.

5. The apparatus according to claim 2, further comprising:
a mechanism that attaches or removes the carrier to allow a different carrier for holding differently sized insulating substrates to be attached.

6. The apparatus according to claim 1, further comprising:
a mechanism that attaches or removes the carrier to allow a different carrier for holding differently sized insulating substrates to be attached.

7. A method of manufacturing a magnetic recording medium with an apparatus for manufacturing a plurality of magnetic recording media comprising:
a deposition device that forms a plurality of layers, including a magnetic layer, on each of a plurality of insulating substrates, each of which has a center hole;
a carrier that holds the plurality of insulating substrates, the carrier having a plurality of supports each for supporting one of the plurality of insulating substrates at a predetermined position,
wherein each of the plurality of supports includes a movable member that is contactable with the outer periphery of one of the insulating substrates; and
a shift mechanism including:
a plurality of first members each comprising first and second pivoting members insertable into the center hole of one of the insulating substrates for holding and releasing the one insulating substrate from inside the respective center hole, and for rotating the one insulating substrate;
a plurality of second members each for engaging one of the movable members and releasing the movable member from contact with the respective outer periphery of the one insulating substrate;
a rotational shaft;
a plurality of cams provided on the rotational shaft; and
a transmission mechanism that transmits rotation of the cams to move both the first and second members,
wherein the cams and the transmission mechanism allow the second members to release the movable members from contact with the insulating substrates and allow the first members to hold and rotate the insulating substrates successively as the rotational shaft is rotated so that each of the movable members contacts a first portion of one of the insulating substrate while each of the insulating substrates is in the predetermined position and contacts a second portion different from the first portion following the rotation of the substrates to a different position, to enable each of the movable members to contact part of the respective substrate having been deposited with a previously formed layer,
wherein the method comprises the steps of:
supporting the insulating substrates with the supports to hold each of the insulating substrates at a respective predetermined position
depositing with a deposition device, a conductive layer on the insulating substrates held by the supports, while each of the movable members is contacting a first portion of one of the insulating substrates at the predetermined position;
rotating, with the shift mechanism, the insulating substrates to collectively change the position of the insulating substrates from the predetermined position to a different position so that each of the movable members contacts a second portion different from the first portion, where the conductive layer is formed on the respective insulating substrate; and forming another layer on the conductive layer, with the deposition device, on each of the insulating substrates while applying a bias voltage on the conductive layers through the movable members, each of which is conductive, contacting the second portion of the substrates where the conductive layer has been formed.

* * * * *